(12) United States Patent
Dieterle

(10) Patent No.: US 10,243,487 B2
(45) Date of Patent: Mar. 26, 2019

(54) BRIDGE AND ENERGY-CONVERTING DEVICE FOR CONVERTING KINETIC ENERGY INTO ELECTRICAL ENERGY

(71) Applicant: Frank Dieterle, Schiltach (DE)

(72) Inventor: Frank Dieterle, Schiltach (DE)

( * ) Notice: Subject to any disclaimer, the term of this patent is extended or adjusted under 35 U.S.C. 154(b) by 0 days.

(21) Appl. No.: 15/749,429

(22) PCT Filed: Jul. 28, 2016

(86) PCT No.: PCT/EP2016/068070
§ 371 (c)(1),
(2) Date: Jan. 31, 2018

(87) PCT Pub. No.: WO2017/021281
PCT Pub. Date: Feb. 9, 2017

(65) Prior Publication Data
US 2018/0226904 A1 Aug. 9, 2018

(30) Foreign Application Priority Data

Jul. 31, 2015 (DE) .......... 20 2015 104 016

(51) Int. Cl.
*E01D 19/04* (2006.01)
*H02N 3/00* (2006.01)
*F03G 7/08* (2006.01)

(52) U.S. Cl.
CPC ............ *H02N 3/00* (2013.01); *E01D 19/042* (2013.01); *F03G 7/08* (2013.01); *E01D 19/04* (2013.01)

(58) Field of Classification Search
CPC .................. E01D 19/04; E01D 19/042
USPC ...................... 14/73.5, 78; 404/71
See application file for complete search history.

(56) References Cited

U.S. PATENT DOCUMENTS

| 6,376,925 | B1* | 4/2002 | Galich ............. | F03G 7/08 290/1 R |
| 7,489,045 | B1* | 2/2009 | Bradford .......... | H02K 7/1853 290/1 A |
| 7,530,761 | B2* | 5/2009 | Kenney ............ | F01D 17/26 404/17 |
| 7,821,183 | B2* | 10/2010 | Rastegar ........... | H02N 2/18 310/339 |
| 8,148,833 | B2* | 4/2012 | Chang .............. | H02K 99/00 290/1 R |
| 8,410,661 | B2* | 4/2013 | Schwarz ........... | H01L 27/20 290/1 R |

(Continued)

FOREIGN PATENT DOCUMENTS

| CN | 103276664 A | 9/2013 |
| DE | 101 40 629 A1 | 3/2003 |

(Continued)

OTHER PUBLICATIONS

Machine translation of DE 102011109905 A1.*

(Continued)

*Primary Examiner* — Gary S Hartmann
(74) *Attorney, Agent, or Firm* — Pauley Erickson & Kottis

(57) ABSTRACT

A bridge with a support structure supporting a deck section provided with at least one energy-converting device for converting kinetic energy into electrical energy. The energy-converting device is at least partly positioned in or on a bridge bearing and/or the energy-converting device at least partly used as a bridge bearing at the same time.

28 Claims, 2 Drawing Sheets

(56) References Cited

U.S. PATENT DOCUMENTS

| | | | |
|---|---|---|---|
| 8,648,516 B2* | 2/2014 | Ha | F03G 7/08 310/339 |
| 8,740,497 B2* | 6/2014 | Gohmann | E01C 9/00 14/78 |
| 9,834,892 B2* | 12/2017 | Farahat | E01C 1/00 |
| 2002/0089309 A1* | 7/2002 | Kenney | H02K 7/1853 322/1 |
| 2003/0034652 A1* | 2/2003 | Slatkin | F03G 7/08 290/1 R |
| 2005/0089370 A1* | 4/2005 | Painchaud | F03G 7/08 404/71 |
| 2010/0072758 A1* | 3/2010 | Chang | H02K 7/1853 290/1 R |
| 2011/0131740 A1* | 6/2011 | Wong | E01D 1/00 14/78 |
| 2011/0302858 A1* | 12/2011 | Siewert | E01C 9/00 52/173.3 |
| 2012/0176003 A1 | 7/2012 | Ha et al. | |
| 2016/0230784 A1* | 8/2016 | Shani | F03G 7/08 |
| 2017/0019034 A1* | 1/2017 | Fujita | F03G 7/08 |
| 2017/0022675 A1 | 1/2017 | Dieterle | |

FOREIGN PATENT DOCUMENTS

| | | |
|---|---|---|
| DE | 10 2011 109 905 A1 | 2/2013 |
| DE | 20 2011 110 542 U1 | 11/2014 |
| DE | 10 2010 034 744 B4 | 7/2015 |
| GB | 2 457 342 A | 8/2009 |
| JP | 2009-243128 A | 10/2009 |
| JP | 2011-149227 A | 8/2011 |
| WO | WO 80/02894 A1 | 12/1980 |
| WO | WO 2014/068466 A2 | 5/2014 |

OTHER PUBLICATIONS

Machine translation of DE 2020011110542 A1.*

European Patent Office, English language version of the International Search Report, Form PCT/ISA/210 for International Application PCT/EP2016/068070 (3 pages).

* cited by examiner

BRIDGE AND ENERGY-CONVERTING DEVICE FOR CONVERTING KINETIC ENERGY INTO ELECTRICAL ENERGY

BACKGROUND OF THE INVENTION

Field of the Invention

This invention relates to a bridge with a support structure supporting a deck section that has at least one energy-converting device for converting kinetic energy into electrical energy.

Discussion of Related Art

Bridges generally include deck transitions supported by a support structure. The support structure includes a support unit for the deck section, abutments, and usually other support elements. Thus in a girder bridge, for example, the support unit is held up by bridge bearings on its underside by bridge piers and abutments. In a suspension bridge, the support unit is suspended on towers by suspension cables.

Vehicles traveling across the deck transition or also wind action often produces an up and down movement of the support unit of several centimeters. The movement can also have horizontal components. Because of the large mass of the objects crossing over the bridge and the large mass of the support unit, such movements contain a large amount or energy.

The use of kinetic energy, which is produced by vehicles, for applications in bridges and roads is suggested by the prior art.

German Patent Reference DE 101 40 629 A1 discloses a method for obtaining electrical energy from the environment in which mechanical movement of elastically supported or moving structures is converted into electrical energy by mechanical/electrical energy converters placed in particular locations. In bridge systems, such energy converters can, for example, be integrated into conventional pot bearings or elastomer bearings or positioned parallel to them. One disadvantage of this is the low yield of electricity or yield of electrical energy.

German Patent Reference DE 10 2011 109 905 A1 discloses a spring-loaded, movable bridge, which is connected to an electric generator by a mechanical transmission.

U.S. Patent Reference US 2012/0176003 A1 discloses a spring-loaded bridge support with an elastomer filling, which contains a plurality of piezoelectric elements for converting bridge oscillations into electrical energy.

PCT International Reference WO 2014/068466 A2 discloses a converter device in the form of a hydraulic piston/cylinder unit in connection with a rotating generator. Among other things, the apparatus can be built into a bridge in addition to bearing elements. More detailed information is not provided.

Japanese Patent Reference JP 2009-243 128 A discloses an electricity generating element for use in a bridge, which is based on a combination of coil springs and a linear generator with a rotor component and a stator component.

Great Britain Patent Reference GB 2 457 342 A discloses a device for converting kinetic energy into usable energy, generally intended for use in roads. The device has a frame with plates fastened to it, which can move relative to the frame and which drive an energy converting device when a vehicle passes over. The frame is installed in a vehicular roadway. It thus changes the nature of the roadway and for this reason, can only be used in certain circumstances such as in a lower-speed zone. It also entails a relatively high installation cost.

German Patent Reference DE 10 2010 034 744 B4 discloses the installation of a hydraulic device for obtaining energy by converting kinetic energy of moving, out-of-gear vehicles in road traffic. The converting device has a frame with pistons and cylinder bores as well as hydraulic conduits. An electric generator, which is coupled to a hydraulic motor, and a piezoelectric power generator are mentioned as devices for achieving the conversion into electrical energy. The purpose of this specially designed converting device is to obtain secondary energy from vehicles that are merely rolling and out-of-gear and the frame is positioned in the vicinity of the roadway.

German Patent Reference DE 20 2011 110 542 U1 discloses a sample embodiment with an energy-converting device for converting mechanical oscillations into electrical energy in connection with a bridge, having a mechanical transmission connected to an electric generator.

SUMMARY OF THE INVENTION

One object of this invention is to provide a bridge that makes it possible to use kinetic energy in the most efficient way possible.

This object and others are attained with features described in this specification and in the claims. In this case, it is stipulated that the energy-converting device is positioned at least partially in or on a bridge bearing and/or that the energy-converting device is at least partly used as a bridge bearing at the same time. The kinetic energy in this case comes from movements of support elements of the support structure, such as a support unit of the deck section. In particular, oscillating up and down movements occur, but they can include horizontal movement components. For example, the support unit itself can be composed of one or more elements and depending on the bridge, can be differently designed, in particular, composed of one or more concrete elements and/or steel supports, and the like. Aside from the deck section, the support unit can also support other components such as railings, bridge caps, and the like. Compared to static support elements such as bridge piers or abutments, but also in some deformable support elements themselves or between moving support elements, relative movements can occur with the movement of the support unit. The above-mentioned incorporation into the support structure of the bridge yields an advantageous use of the bridge in connection with the energy-converting device without negatively affecting the deck section. When the energy-converting device is positioned at least partially in or on a bridge bearing, for example on the abutment, it is in a not only visually inconspicuous, but also protected location. At least parts of the energy-converting device can be reliably installed there for effective energy use. It is advantageous if the energy-converting device is at least partly used as a bridge bearing at the same time. Because an element of the support structure of the bridge itself, which is needed for the construction of the bridge anyway, is used for the energy conversion, this minimizes the structural expense of the energy use according to this invention. It also requires a small amount of installation space, with only the periphery of the energy-converting device, such as the electrical connections, possible storage devices, or other, for example mechanical or hydraulic, elements having to be taken into account. In this case, the energy-converting device can also be designed in a visually inconspicuous way. The energy-converting device can be at least partly installed in the bridge from the outset or can be retrofitted onto it.

A support element as defined by this invention is a part of the support structure, for example, it absorbs part of the load on the deck section. In this connection, support elements can include, for example, bridge piers, bridge bearings or abutments, support units, or braces, but also springs or steel cables, for example in the case of a suspension bridge, and the like.

In one embodiment of this invention, the energy-converting device is positioned in transition regions between at least two support elements of the support structure that move relative to each other. In this way, it is possible to make use of different movements for energy production.

In one embodiment the energy-converting device is positioned at least partly in the region between a stationary abutment and/or bridge pier of the bridge and a support element that is supported on the latter in a force-introducing way. In this way, the energy-converting device experiences the relative movement of the moving support unit in relation to the abutment and/or bridge pier, which is a static, non-moving element. It is thus possible to transmit the direct up and down movement of the support unit directly to the energy-converting device.

The support elements that accommodate various parts of the energy-converting device can already be appropriately formed at the factory and can be used when a bridge is constructed for the first time or can be retrofitted onto it later.

Because movements, in particular oscillations of at least parts of the support structure, which are produced due to changing loads on the deck section and/or by wind, are used as kinetic energy for conversion by the energy-converting device, the energy-converting device makes it possible to use energy that is transferred to the bridge anyway, but which would be lost without the energy exploitation according to this invention. In this way, this invention contributes to an efficient energy use. Even the potential energy of the loads on the bridge can be used in this case.

A simple installation option is achieved if the energy-converting device has a piston/cylinder unit or bellows structure with a hydraulic or pneumatic drive or a spring plunger that is supported by a spring force. Such an embodiment can be positioned with particular ease in a parallel fashion between the bridge bearings and/or can itself simultaneously serve as a bridge bearing.

If the energy-converting device has a movement device that operates in a rotary or translatory fashion, which can be excited by the kinetic energy and can drive a body, that is contained in a mechanical/electrical converting unit, in rotary or translatory fashion, this permits a simple and efficient conversion of the kinetic energy into electrical energy by an electric generator.

The energy can be converted in a particularly efficient way if the energy-converting device has a coil device and a permanent magnet arrangement that cooperates with the latter. To this end, a movement device that operates in a rotary or translatory fashion can drive a, for example, reasonably dimensioned inertia mass with a cyclical movement.

One advantageous use of energy is achieved by the bridge according to this invention if a feed device for feeding the electrical energy into the public network is provided and/or a storage device, which is connected to the energy-converting device, is provided, for example, rechargeable batteries or storage capacitors. It is particularly suitable to use storage in the form of chemical energy, particularly in rechargeable batteries.

There is a broad field of use for the bridge according to this invention if the bridge is a motor vehicle bridge and/or a pedestrian bridge and/or a railroad bridge.

In one embodiment of this invention, the part of the energy-converting device that is positioned in or on the bridge bearing and/or is used as a bridge bearing has a hydraulic plunger or is embodied as a hydraulic plunger. The hydraulic plunger in this case preferably has a piston/cylinder unit, with the piston's movement changing the volume of a fluid changer that is filled with hydraulic fluid. The fluid chamber in this case is contained in the cylinder chamber surrounding the piston. The hydraulic plunger permits a precise design that matches the loads that are to be absorbed by it. Certain displacing movements of the piston of the hydraulic plunger can occur at certain loads, particularly along a central longitudinal axis M. If the support unit of the bridge is set into motion, for example by a passenger car or truck passing over it, then this motion is transmitted to each hydraulic plunger, whose piston is set into motion. By connecting pistons with different areas in parallel or in series, it is also possible to achieve different actuation paths and transmission ratios as a function of the load and the embodiment of the generator that is to be operated. It is possible to achieve definite flow durations and damping properties by providing different sizes of flow bores for the fluid.

For the function as part of an energy-converting device, it is advantageous if the piston of the hydraulic plunger executes a displacing movement along a central longitudinal axis M of the hydraulic plunger of at least 1.5 cm, in particular at least 2 cm. Such a relatively large displacing movement, for example greater than in conventionally used elastomer bearings, is advantageous for the power generation. In this case, the hydraulic plunger or the bridge bearing equipped with the hydraulic plunger is preferably designed so that horizontal, for example sliding, movements of the bridge can also be absorbed, which offers advantages for the simultaneous use as a bridge bearing.

A contribution to an advantageous function as a bridge bearing is made if the hydraulic plunger is associated with a spring element for restoring the displacing movement of the hydraulic plunger. The spring element in this case is preferably positioned in the same element as the hydraulic plunger, for example, surrounding the hydraulic plunger, or in some other advantageous way. This achieves an element that is well-suited for use as a bridge bearing because of the matching of the spring force and the hydraulic plunger. If the hydraulic plunger is pushed in because of bridge movements, then the spring force ensures a restoring to the original vertical position. Alternatively or additionally, a restoring can be carried out by communicating tubes through changing loads.

A flexible system for electricity generation is achieved if the energy-converting device has a hydraulic fluid-conveying hydraulic circuit to which the hydraulic plunger is connected and if the hydraulic circuit contains a generator for converting the fluid movement of the hydraulic fluid into electrical energy. The movement of the hydraulic plunger sets the fluid in the circuit into motion and drives the generator. In this case, one advantage is the relatively large displacing movement of at least 1.5 cm because this moves a relatively large volume of fluid, which drives the generator.

It can be advantageous for the function of the energy-converting device if a compensation receptacle such as a buffering or compensating reservoir is provided for hydraulic fluid. On the one hand, this reservoir can permit an escape of hydraulic fluid that the piston displaces from a hydraulic fluid-containing fluid chamber of one or more hydraulic plungers. Fluid then travels back into the hydraulic plunger again as the spring element is restoring the piston to its original position. On the other hand, the reservoir can be used to compensate for possible hydraulic fluid losses from the circuit, permitting lost hydraulic fluid to be replenished.

If the hydraulic line of the hydraulic circuit is composed of a plurality of tube elements that are sealed in relation to one another, which term is understood to also include hose elements, so that they form a modularly expandable system together with at least one hydraulic plunger, then it is possible to expand the system with additional elements of the energy-converting device.

It is thus advantageous, for example, if at least two hydraulic plungers are connected to the hydraulic circuit. In a particularly efficient and simply embodied variant of the energy-converting device, all of the hydraulic plungers that are used as bridge bearings are connected to the circuit so that only one generator, for example, is required in the entire system of the energy-converting device of a bridge. It is also possible for the circuit to have other hydraulic elements of the energy-converting device connected to it, for example also including elements that absorb a horizontal bridge movement, or other elements.

BRIEF DESCRIPTION OF THE DRAWINGS

This invention is explained in greater detail in view of on exemplary embodiments with reference to the drawings, wherein.

DETAILED DESCRIPTION OF THE INVENTION

Figure 1:
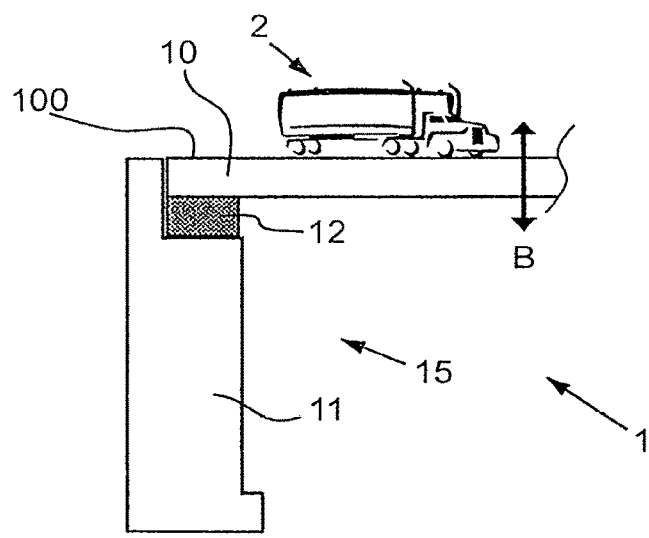
FIG. 1 shows a side view of a section of a bridge with a support structure and support unit.

FIG. 1 shows a section of a bridge 1 with a support structure 15 that includes a support unit 10. On the support unit 10, there is a deck section 100, which for example forms a section of a highway and over which a motor vehicle 2 is traveling. Other components that are not shown here, for example guard rails, railings and the like, can be provided on the deck section 100 and/or on the support unit 10. The support unit 10 is supported in moving fashion on at least one other support element of the support structure 15, which comprises or is composed of an abutment 11, by a plurality of bridge bearings 12, one of which is shown here. The bridge bearings 12 also constitute or form parts of the support structure 15. In addition to bridge bearings 12, the support structure 15 includes at least two abutments 11, situated at the two respective ends of the bridge, one of which is shown in FIG. 1. The support structure 15 also has a plurality of bridge piers (not shown). The abutment 11 is placed statically on the subsoil so that when up and down movements B of the support unit 10 occur, a relative movement between the support unit 10 and the abutment 11 takes place, which is absorbed by the bridge bearing 12. The movements of the support unit 10 in this case are mainly produced by motor vehicles traveling over the deck section 100. Wind movements acting on the support structure 15 can also cause movements.

Figure 2:
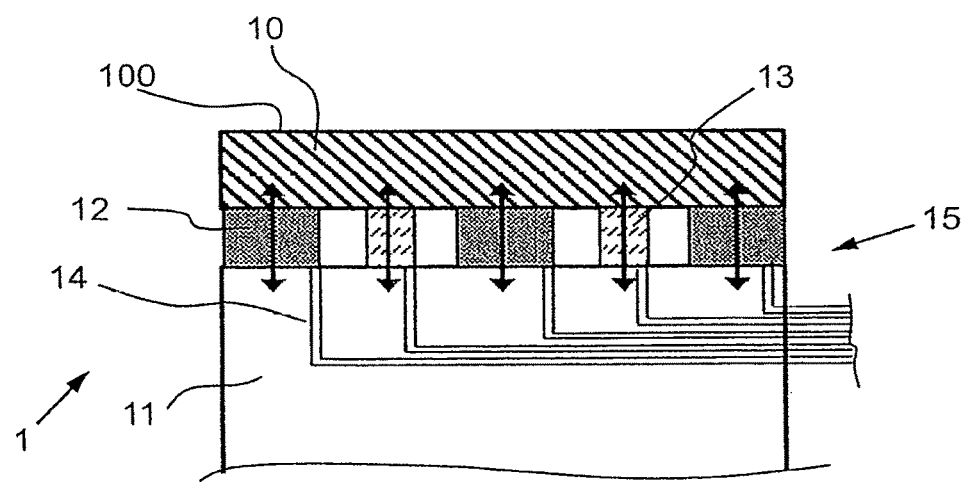
FIG. 2 shows a front view an upper section of a bridge with an abutment, with a section taken through the support unit according to FIG. 1, with parts of an energy-converting device.

FIG. 2 shows the upper section of the abutment 11 form the front, with the support unit 10 that has the deck section 100 shown in a sectional view. The width of the abutment 11 in this case essentially coincides with the width of the support unit 10, but an abutment width that is different from the support unit width would also be conceivable. Underneath the support unit 10, there are three bridge bearings 12 by which the support unit 10 is supported on the abutment 11 in a movable fashion relative to the latter. In addition to these, arranged in parallel fashion between the bridge bearings 12, an energy-converting device 13 is provided that has two separate energy-converting units, which, because of their positioning, experience approximately the same movements as the bridge bearings 12. For example, the energy-converting units of the energy-converting device 13 each has a piston/cylinder unit with a hydraulic drive, for example also embodied in the form of a hydraulic plunger 30 (see FIG. 3), which convert the up and down movements of the support unit 10 into electrical energy by the moving hydraulic fluid, for example with the aid of a coil arrangement that is moved relative to a permanent magnet arrangement (induction principle). In FIG. 2, the bridge bearings 12 can also be embodied so that they function as an energy-converting device 13. They are also composed, for example, of or comprise a piston/cylinder unit with a hydraulic drive, but are not solid on the whole. It is also possible for a suitable spring support to be incorporated into it. The bridge bearings 12 can thus absorb and support the weight of the support unit 10 with the deck section 100 and the loads on them that are essentially distributed between all of the bridge bearings 12. From the energy-converting units of the energy-converting device 13 and from the bridge bearings 12 that are embodied in this way, electrical connections 14 lead to a storage device (not shown here), which is composed of or comprises a plurality of rechargeable batteries. The electrical energy that is converted from the movement of the bridge 1 is stored in them and can be drawn from them, for example in order to operate electrical equipment such as illumination devices.

Figure 3:
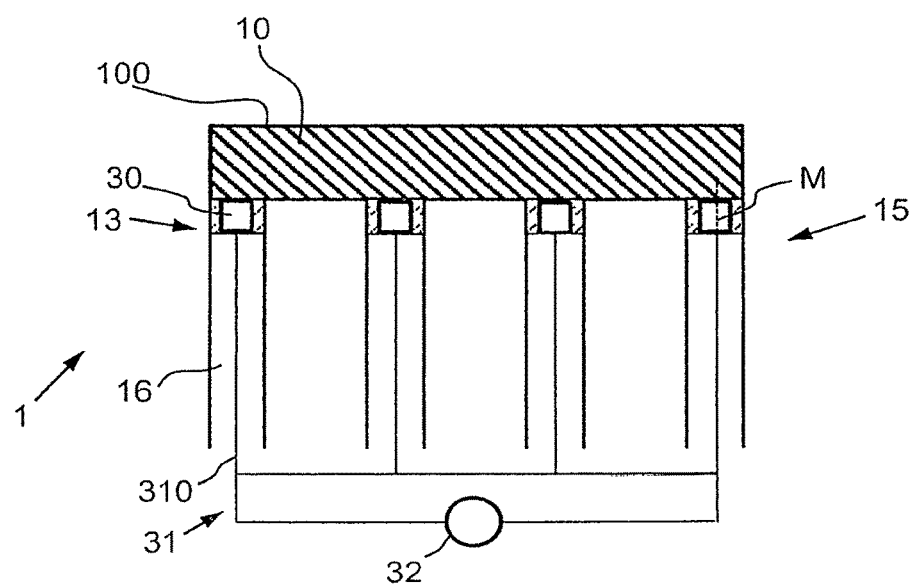
FIG. 3 is a schematic side view of a bridge with another variant of an energy-converting device.

FIG. 3 shows another variant of the energy-converting device 13. In this embodiment, in addition to a plurality of bridge bearings 12, the energy-converting device 13 also has a hydraulic circuit 31 and a generator 32 contained in the circuit 31. The bridge bearings 12 in this case are positioned on bridge piers 16, but they could also be positioned at other points on the bridge, for example on the abutment as shown in FIG. 2. The bridge bearings 12 are embodied as hydraulic plungers 30 in such a way that when the support unit 10 moves, they are able, possibly with a multiplication, to produce a vertical displacing movement of at least 1.5 cm, in particular at least 2 cm. In addition, the hydraulic plungers are preferably associated with spring supports in the form of spring elements (not shown here) and the elements belonging to the bridge bearing 12 can also be enclosed in a protective housing. The bridge bearings 12 are embodied in such a way that they can also absorb horizontal movement components, in particular of the kind that can occur with tilting movements relative to the direction of gravity, without negatively affecting the piston/cylinder unit. To this end, it is also possible, for example, for spherical segment-like caps or the like to be provided. All of the hydraulic plungers 30, which are installed on the bridge 1 and embodied as bridge bearings 12, are connected to the hydraulic circuit 31, which is sealed relative to the environment and is filled with hydraulic fluid. The generator serves as the energy-converting unit that actually converts movement energy of the moving hydraulic fluid into electrical energy.

If the support unit 10 is now subjected to a load, for example by a truck LKW passing over it, the movement of the support unit 10 is transmitted to the piston of the piston/cylinder unit, with the piston being pushed downward along a central longitudinal axis M of the hydraulic plunger 30 inside the cylinder at first. As a result, a hydraulic fluid-filled fluid chamber in the region of or near the cylinder of the hydraulic plunger 30 is compressed and hydraulic fluid is displaced from the fluid chamber through a defined outlet into hydraulic lines 310 of the hydraulic circuit 31. The fluid volume that is additionally pushed into the hydraulic lines 310 can travel into a buffering reservoir, not shown here, which is preferably likewise situated in the hydraulic circuit 31 and can also, for example, be a diaphragm receptacle with a stretchable diaphragm. In this way, a fluid movement of the hydraulic fluid is produced, which drives the generator 32, which in turn converts the movement energy of the fluid into electrical energy.

In the upward motion of the piston following the downward motion, hydraulic fluid is once again moved in the other direction into the fluid chamber of the hydraulic plunger 30. The resulting fluid movement in the opposite direction in the hydraulic circuit 31 can once again be used by the generator 32 to produce electricity.

Preferably, the hydraulic lines 310 are connected to one another in modular fashion by sealing elements and corresponding adapters in such a way that the system of the energy-converting device 13 can easily be expanded, for example by one or more hydraulic plungers 30. In this way, the bridge 1 is associated with an energy-converting device 13 that is embodied as a closed system, which can be installed not only in new construction projects, but also afterward in a bridge retrofitting project. If in a bridge retrofitting project, bridge bearings 12 are removed one after another in intervals over time and replaced with bridge bearings 12 embodied as hydraulic plungers 30, these can also be connected afterward to the already existing system. Naturally, it would also be conceivable for a plurality of energy-converting devices 13 with their own hydraulic circuits 31 and generators 32 to be installed on a bridge 1 or, for example, for a plurality of generators 32 to be contained in one circuit 31.

With the various embodiments of the installed energy-converting device 13, in addition to its main function as an overpass, the bridge simultaneously offers the use of energy recovery. If the electrical energy is used by equipment located in the vicinity of or near the bridge itself, then savings can be achieved by eliminating the need for a costly supply of energy from outside.

The invention claimed is:

1. A bridge (1) with a support structure (15), which supports a deck section (100), the bridge comprising:
a bridge bearing between the support structure and the deck section, the bridge bearing including at least one energy-converting device (13) for converting kinetic energy into electrical energy, the energy-converting device (13) comprising a hydraulic or pneumatic drive with a fluid, and converts movements of the bridge into electrical energy by moving the fluid with respect to a generator.

2. The bridge (1) according to claim 1, wherein the bridge bearing and the energy-converting device (13) is at least partly positioned at a transition region between at least two support elements of the support structure (15) that can move relative to each other.

3. The bridge (1) according to claim 2, wherein the bridge bearing and the energy-converting device (13) are at least partly positioned in the region between a stationary abutment (11) and/or bridge pier (16) of the bridge (1) and a support element that is supported in a force-introducing way.

4. The bridge (1) according to claim 3, wherein the energy-converting device (13) is at least partly positioned in a parallel fashion between two bridge bearings (12).

5. The bridge (1) according to claim 4, wherein oscillations of at least parts of the support structure (15), which are produced due to changing loads on the deck section (100) and/or by wind, are used as kinetic energy for conversion by the energy-converting device (13).

6. The bridge (1) according to claim 5, wherein the energy-converting device (13) comprises a piston/cylinder unit or bellows structure or a spring plunger that is supported by a spring force.

7. The bridge (1) according to claim 6, wherein the energy-converting device (13) has a movement device that operates in a rotary or translatory fashion which can be excited by the kinetic energy and can drive a body contained in a mechanical/electrical converting unit in a rotary or translatory fashion.

8. The bridge (1) according to claim 7, wherein the energy-converting device (13) has a coil device and a cooperating permanent magnet arrangement.

9. The bridge (1) according to claim 8, wherein a part of the energy-converting device (13) comprises a hydraulic plunger (30) or is embodied as a hydraulic plunger (30).

10. The bridge (1) according to claim 9, wherein the hydraulic plunger (30) executes a displacing movement along a central longitudinal axis M of the hydraulic plunger (30) of at least 1.5 cm.

11. The bridge (1) according to claim 10, wherein the hydraulic plunger (30) is associated with a spring element for restoring the displacing movement of the hydraulic plunger (30) or a plurality of hydraulic plungers are positioned in alternating fashion in a system with communicating tubes and can be restored as a result of changing loads.

12. The bridge (1) according to claim 11, wherein the energy-converting device (13) comprises a hydraulic fluid-conveying hydraulic circuit (31) to which the hydraulic plunger (30) is connected and the hydraulic circuit (31) includes the generator (32) for converting the fluid movement of the hydraulic fluid into electrical energy.

13. The bridge (1) according to claim 12, wherein a compensation receptacle for hydraulic fluid is provided.

14. The bridge (1) according to claim 13, wherein a hydraulic line (310) of the hydraulic circuit (310) comprises a plurality of tube elements that are sealed in relation to one another to form a modularly expandable system together with at least one hydraulic plunger (30).

15. The bridge (1) according to claim 14, wherein at least two hydraulic plungers (30) are connected to the hydraulic circuit (31).

16. The bridge (1) according to claim 1, wherein the bridge bearing is at least partly positioned in a region between a stationary abutment (11) and/or bridge pier (16) of the bridge (1) and a support element that is supported in a force-introducing way.

17. The bridge (1) according to claim 1, wherein the energy-converting device (13) is at least partly positioned in a parallel fashion between two bridge bearings (12).

18. The bridge (1) according to claim 1, wherein movements and oscillations of at least parts of the support structure (15), which are produced due to changing loads on the deck section (100) and/or by wind, are used as kinetic energy for conversion by the energy-converting device (13).

19. The bridge (1) according to claim 1, wherein the energy-converting device (13) comprises a piston/cylinder unit or bellows structure with a hydraulic or pneumatic drive or a spring plunger that is supported by a spring force.

20. The bridge (1) according to claim 1, wherein the energy-converting device (13) comprises a movement device that operates in a rotary or translatory fashion which is excited by the kinetic energy and can drive a body contained in a mechanical/electrical converting unit in a rotary or translatory fashion.

21. The bridge (1) according to claim 1, wherein the energy-converting device (13) comprises a coil device and a cooperating permanent magnet arrangement.

22. The bridge (1) according to claim 1, further comprising a feed device for feeding the electrical energy into the public network and/or a storage device connected to the energy-converting device (13).

23. The bridge (1) according to claim 1, wherein the bridge (1) is a motor vehicle bridge and/or a pedestrian bridge and/or a railroad bridge.

24. The bridge (1) according to claim 1, wherein the energy-converting device (13) comprises a hydraulic plunger (30).

25. The bridge (1) according to claim 12, wherein a hydraulic line (310) of the hydraulic circuit (310) comprises a plurality of tube elements that are sealed in relation to one another to form a modularly expandable system together with at least one hydraulic plunger (30).

26. The bridge (1) according to claim 13, wherein at least two hydraulic plungers (30) of two bridge bearings are connected to the hydraulic circuit (31).

27. The bridge (1) according to claim 1, wherein the hydraulic or pneumatic drive comprises a hydraulic plunger (30) and a spring element for restoring a displacing movement of the hydraulic plunger (30).

28. The bridge (1) according to claim 27, wherein the spring element surrounds the hydraulic plunger (30).

* * * * *